United States Patent
Bertz et al.

(10) Patent No.: US 8,442,526 B1
(45) Date of Patent: May 14, 2013

(54) METHOD AND SYSTEM FOR REGISTERING A MOBILE NODE VIA A REGISTRATION PROXY

(75) Inventors: Lyle T. Bertz, Lee's Summit, MO (US);
William J. Routt, Leawood, KS (US);
Ihab A. Guirguis, Aldie, VA (US);
Ronald E. Lewis, Independence, MO (US); Christopher R. Melus, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 1632 days.

(21) Appl. No.: 11/859,949

(22) Filed: Sep. 24, 2007

(51) Int. Cl.
*H04W 4/00* (2009.01)

(52) U.S. Cl.
USPC ........................................ 455/435.1; 455/433

(58) Field of Classification Search .................. 455/433, 455/432.3, 435.1–453.3, 436, 432.1; 370/352, 370/356, 395.31, 310.2
See application file for complete search history.

(56) References Cited

U.S. PATENT DOCUMENTS

| | | | |
|---|---|---|---|
| 5,659,598 A | 8/1997 | Byrne et al. | |
| 6,424,638 B1 | 7/2002 | Ray et al. | |
| 6,757,732 B1 | 6/2004 | Sollee et al. | |
| 6,768,726 B2 | 7/2004 | Dorenbosch et al. | |
| 6,778,527 B1 * | 8/2004 | Amin | 370/352 |
| 6,909,899 B2 | 6/2005 | Wang et al. | |
| 6,950,657 B1 | 9/2005 | Hiller et al. | |
| 7,054,618 B1 | 5/2006 | McCullough | |
| 7,139,833 B2 | 11/2006 | Heller | |
| 7,143,187 B1 * | 11/2006 | Takeda et al. | 709/245 |
| 7,162,529 B2 | 1/2007 | Morishige et al. | |
| 7,181,537 B2 | 2/2007 | Costa-Requena et al. | |
| 7,269,173 B2 * | 9/2007 | Iyer et al. | 370/395.31 |
| 7,299,046 B1 | 11/2007 | Ozugur et al. | |
| 7,436,848 B1 * | 10/2008 | Lewis et al. | 370/462 |
| 7,545,762 B1 * | 6/2009 | McConnell et al. | 370/310.2 |
| 7,602,795 B1 | 10/2009 | Mazza-Deblauwe | |
| 7,616,647 B1 | 11/2009 | Madhavarapu et al. | |
| 8,045,983 B2 * | 10/2011 | Bantukul | 455/435.1 |
| 2002/0068570 A1 | 6/2002 | Abrol et al. | |
| 2003/0016639 A1 | 1/2003 | Kransmo et al. | |
| 2003/0027595 A1 * | 2/2003 | Ejzak | 455/560 |
| 2003/0119489 A1 | 6/2003 | Mohammed | |
| 2004/0008645 A1 | 1/2004 | Janevski et al. | |
| 2004/0052238 A1 | 3/2004 | Borella et al. | |
| 2004/0082330 A1 | 4/2004 | Marin | |
| 2004/0103157 A1 | 5/2004 | Requena et al. | |

(Continued)

OTHER PUBLICATIONS

US 2006/0276138, Dec. 2006, Pummill et al. (withdrawn).
ADC Telecommunications, "Wireless Short message Service Tutorial," 1999.
$3^{rd}$ Generation Partnership Project 2, "Short Message Service over IMS," 3GPP2 X.P0048-0, Version 7, Oct. 2006.

(Continued)

*Primary Examiner* — Melody Mehrpour
*Assistant Examiner* — Emem Stephen (57) ABSTRACT

An application server provides communication services via a packet-switched network to mobile nodes based on their respective registrations in a registry, such as a home subscriber server (HSS) or domain name server (DNS). A registration proxy may be used to effect a registration in the registry on behalf of a mobile node when the mobile node lacks sufficient capability to effect the registration itself. The registration proxy may perform this function after receiving a notification that the mobile node is connected to the packet-switched network and after querying a capabilities server to determine that the mobile node lacks sufficient registration capability. To effect a registration in an HSS, the registration proxy may emulate either a serving call state control function (S-CSCF) or user equipment (UE).

19 Claims, 6 Drawing Sheets

U.S. PATENT DOCUMENTS

| | | | |
|---|---|---|---|
| 2004/0128344 A1* | 7/2004 | Trossen | 709/203 |
| 2004/0218566 A1 | 11/2004 | Han | |
| 2005/0053034 A1 | 3/2005 | Chiueh | |
| 2005/0130660 A1 | 6/2005 | Park et al. | |
| 2005/0227691 A1 | 10/2005 | Pecen et al. | |
| 2005/0266845 A1 | 12/2005 | Aerrabotu et al. | |
| 2005/0282565 A1 | 12/2005 | Shaheen | |
| 2006/0098621 A1 | 5/2006 | Plata Andres et al. | |
| 2006/0120362 A1 | 6/2006 | Westman et al. | |
| 2006/0206504 A1 | 9/2006 | Cai et al. | |
| 2006/0256748 A1* | 11/2006 | Jung et al. | 370/328 |
| 2006/0271687 A1 | 11/2006 | Alston et al. | |
| 2006/0276137 A1 | 12/2006 | Pummill et al. | |
| 2006/0276139 A1 | 12/2006 | Pummill et al. | |
| 2006/0281474 A1 | 12/2006 | Domville et al. | |
| 2007/0008957 A1 | 1/2007 | Huang | |
| 2007/0014301 A1 | 1/2007 | Miller et al. | |
| 2007/0032251 A1 | 2/2007 | Shaheen | |
| 2007/0043829 A1 | 2/2007 | Dua | |
| 2007/0061397 A1 | 3/2007 | Gregorat et al. | |
| 2007/0071221 A1 | 3/2007 | Allen et al. | |

OTHER PUBLICATIONS

P. Vixie et al., Network Working Group, "Dynamic Updates in the Domain Name System (DNS Update)", Request for Comments: 2136, Apr. 1997.

C. Rigney et al., Network Working Group, "Remote Authentication Dial in User Service (RADIUS)", Request for Comments: 2865, Jun. 2000.

C. Rigney., Network Working Group, "RADIUS Accounting", Request for Comments: 2866, Jun. 2000.

B. Campbell et al., Network Working Group, "Session Initiation Protocol (SIP) Extension for Instant Messaging", Request for Comments: 3428, Dec. 2002.

R. Arends et al., Network Working Group, "DNS Security Introduction and Requirements", Request for Comments: 4033, Mar. 2005.

R. Arends et al., Network Working Group, "Resource Records for the DNS Security Extensions", Request for Comments: 4034, Mar. 2005.

R. Arends et al., Network Working Group, "Protocol Modifications for the DNS Security Extensions", Request for Comments: 4035, Mar. 2005.

* cited by examiner

METHOD AND SYSTEM FOR REGISTERING A MOBILE NODE VIA A REGISTRATION PROXY

BACKGROUND

1. Field of the Invention

The present invention relates to telecommunications and, more particularly, to methods and systems for effecting a registration in a registry on behalf of a mobile node.

2. Description of Related Art

Text messaging has become a popular method of communicating using wireless telephones. The Short Message Service (SMS) protocol has been used to provide this text messaging capability. Relevant aspects of SMS are described in the IS-41 standards published by the Telecommunication Industry Association and in the GSM MAP standards published by the European Telecommunication Standards Institute. A recent revision of the IS-41 standards, titled "Cellular Radio telecommunications Intersystem Operations," TIA/EIA/IS-41-D, published in 1997, is incorporated herein by reference.

Wireless telephones are also increasingly being used for packet-based communication. One approach for providing packet-based communication services to user equipment (UE) such as wireless telephones is based on a network architecture known as the Internet Protocol Multimedia Subsystem (IMS). The IMS approach is described in various documents that are published by the 3$^{rd}$ Generation Partnership Project 2 (3GPP2), including the following documents that are incorporated herein by reference:

"All-IP Core Network Multimedia Domain: IP Multimedia Subsystem—Stage 2," 3GPP2 X.S0013-002-A, version 1.0, published November 2005;

"All-IP Core Network Multimedia Domain: IP Multimedia (IMS) Session Handling; IP Multimedia (IM) Call Model; Stage 2," 3GPP2 X.50013-003-A, version 1.0, published November 2005; and "All-IP Core Network Multimedia Domain: IP Multimedia Call Control Protocol Based on SIP and SDP; Stage 3," 3GPP2 X.S0013-004-A, version 1.0, published November 2005.

As the third document suggests, the IMS approach (as currently envisioned) uses the Session Initiation Protocol (SIP) and the Session Description Protocol (SDP) to provide communication services to UEs. Relevant aspects of SIP are described in J. Rosenberg et al., "SIP: Session Initiation Protocol," Request for Comments 3261, June 2002, which is incorporated herein by reference. Relevant aspects of SDP are described in M. Handley et al., "SDP: Session Description Protocol," Request for Comments 4566, July 2006, which is incorporated herein by reference.

Recently, an IMS approach for delivering SMS messages has been proposed. See 3$^{rd}$ Generation Partnership Project 2, "Short Message Service over IMS," 3GPP2 X.P0048-0, version 0.7, published October 2006. In this proposal, a short message service gateway (SMS-GW) uses the SIP MESSAGE method to transmit SMS messages. The SIP MESSAGE method is described in B. Campbell et al., "Session Initiation Protocol (SIP) for Instant Messaging," Request for Comments 3428, dated December 2002, which is incorporated herein by reference.

SUMMARY

In a first principal aspect, an exemplary embodiment of the present invention provides a method for registering a mobile node with a registry that is communicatively coupled to an application server, the application server providing communication services to mobile nodes based on their respective registrations in the registry. In accordance with the method, a first network element determines from a status message generated by a network access server (NAS) that the mobile node is connected to the packet-switched network. The first network element responsively sends a notification message to a second network element. The notification message includes a network address of the mobile node and at least one other identifier associated with the mobile node. After receiving the notification message, the second network element uses the network address and the at least one other identifier to effect a registration in the registry on behalf of the mobile node.

In a second principal aspect, an exemplary embodiment of the present invention provides a method for registering a mobile node with a registry that is communicatively coupled to an application server, the application server providing communication services via a packet-switched network to mobile nodes based on their respective registrations in the registry. The method comprises the steps of detecting that the mobile node is connected to the packet-switched network, determining a registration capability of the mobile node, and, if the registration capability of the mobile node satisfies at least one preset condition, a registration proxy effects a registration in the registry on behalf of the mobile node.

In a third principal aspect, an exemplary embodiment of the present invention provides a system comprising a registry, an application server communicatively coupled to the registry, and a registration proxy. The application server is configured to provide communication services via a packet-switched network to mobile nodes based on registrations stored in the registry. The registration proxy is configured to effect registrations in the registry on behalf of mobile nodes that lack registration capability.

DETAILED DESCRIPTION OF EXEMPLARY EMBODIMENTS

1. Overview

The inventors have recognized that the aforementioned proposal titled "Short Message Service over IMS" does not fully utilize the capability of using SIP to deliver SMS messages to mobile nodes. In particular, the proposal requires a mobile node to be IMS registered in order to receive SMS messages using SIP. To become IMS registered, a mobile node must transmit and receive SIP messages in a manner that conforms to IMS standards. Because IMS registration requirements are more stringent than simply being able to support SIP, a substantial number of mobile nodes that are SIP-capable lack the capability of effecting an IMS registration.

To address this limitation, the inventors propose a registration proxy that effects IMS registrations on behalf of mobile nodes. The registration proxy may effect a registration on behalf a mobile node automatically, e.g., when the mobile node establishes a network connection. In an exemplary embodiment, an authentication, authorization, and accounting (AAA) server receives status messages regarding the network presence of mobile nodes. When the AAA server determines from these status messages that a mobile node has established a network connection, the AAA server sends a notification to the registration proxy. The notification may include an IP address of the mobile node and one or more other identifiers associated with the mobile node, such as a mobile directory number (MDN) and/or network access identifier (NAI). The registration proxy may then use the mobile node's IP address and the other identifiers associated with the mobile node to effect an IMS registration on behalf of the mobile node.

To effect an IMS registration on behalf of a mobile node, the registration proxy could, for example, emulate either user equipment (UE) or a serving call session control function (S-CSCF) in the IMS registration process. To emulate a UE, the registration proxy may transmit a SIP REGISTER request to a proxy call session control function (P-CSCF). The SIP REGISTER request may include the mobile node credentials needed for IMS registration. These mobile node credentials may include, for example, the mobile node's IP address, private identity, and one or more public identities. The private identity could be, for example, a network access identifier (NAI) used by the mobile node. The one or more public identities may include, for example, the mobile node's MDN in the form of a SIP Uniform Resource Identifier (URI). The P-CSCF may then send a SIP REGISTER request containing the private and public identities to an interrogating call session control function (I-CSCF). The I-CSCF may determine which S-CSCF is to be used for registering the mobile node, e.g., by querying the home subscriber server (HSS), and then send a SIP REGISTER request containing the private and public identities to that S-CSCF. The S-CSCF may then register the private and public identities with the HSS, along with the name of the S-CSCF.

In this way, the HSS may store a registration that correlates the mobile node's MDN (in the form of a SIP URI) and NAI with the name of the S-CSCF that is currently serving the mobile node. Thereafter, when the IMS network receives a request to provide a communication service (such as sending an SMS message) to the mobile node, identified by its MDN, the mobile node's registration may be used to determine which S-CSCF is currently serving the mode node. An application server may then provide the requested communication service by sending one or more SIP messages to the S-CSCF.

To emulate an S-CSCF, the registration proxy may communicate directly with the HSS to register the mobile node's IP address (in the form of a SIP URI), private identity, and one or more public identities. The private identity could be, for example, the mobile node's NAI. The one or more public identities may include the mobile node's MDN (e.g., in the form of a SIP URI). As a result, the HSS may store a registration that correlates the mobile node's MDN with the mobile node's IP address and NAI.

In that case, when the IMS network receives a request to provide a communication service (such as sending an SMS message) to the mobile node, identified by its MDN, the mobile node's registration may be used to determine the mobile node's IP address. An application server may then provide the requested communication service by sending one or more SIP messages to the mobile node's IP address. In this approach, the mobile node's IP address effectively takes the place of the S-CSCF name that is registered when the registration proxy emulates a UE.

The registration proxy could be configured to effect an IMS registration on behalf of a mobile node, regardless of the mobile node's registration capability. Alternatively, the registration proxy could be configured to effect an IMS registration on behalf of a mobile node after determining that the mobile node's registration capability satisfies one or more preset conditions. The registration proxy may make this determination by consulting a capabilities server that stores information regarding the capabilities of mobile nodes. The capabilities server may indicate the registration capabilities of mobile nodes in various ways. For example, the capabilities server may indicate which mobile nodes are SIP-capable and which are not. SIP-capable mobile nodes may be expected to have the ability to effect some type of SIP registration, but certain SIP-capable mobile nodes may nonetheless lack the capability to effect an IMS registration. Thus, the capabilities server may indicate whether a SIP-capable mobile node is capable of effecting an IMS registration.

Thus, when the registration proxy is notified that a mobile node has established network connectivity, the registration proxy may consult the capabilities server to determine the mobile node's registration capability. If the mobile node is SIP-capable but unable to effect an IMS registration, the registration may effect a registration on behalf of the mobile node. Moreover, the registration proxy may be configured so as not to attempt registrations on behalf of mobile nodes that are not SIP-capable or on behalf of mobile nodes that are SIP-capable and also capable of IMS registration.

It is to be understood that a registration proxy could be used to effect a registration on behalf of a mobile node in registries other than or in addition to an HSS. For example, a registration proxy may effect a registration in a domain name server (DNS) on behalf of a mobile node. The DNS registration may correlate the mobile node's IP address with a hostname associated with the mobile node. The hostname could be constructed by concatenating the mobile node's MDN with a domain name of the mobile node's wireless service provider. Thus, the hostname of a mobile node that has 816-555-1234 as its MDN and a wireless service plan with Sprint Nextel might be 8165551234.sprintnextel.com. An application server in the IMS network may refer to this DNS registration to determine the mobile node's IP address and then provide communication service to the mobile node by sending one or more SIP messages to the mobile node's IP address.

The registration proxy may effect a DNS registration on behalf of a mobile node, for example, by using the DNS UPDATE protocol. A recent version of the DNS UPDATE protocol is described in P. Vixie et al., "Dynamic Updates in the Domain Name System (DNS UPDATE)," Request for Comments 2136, April 1997, which is incorporated herein by reference.

In general, an application server may provide communication services to mobile nodes based on their respective registrations in a registry (which could be an HSS, DNS, or other type of registry), and a registration proxy may effect registrations in that registry for some or all of such mobile nodes. In this way, a mobile node may be able to receive services provided by an application server even when the mobile node is unable to register itself with the registry used by that application server.

2. Exemplary Network Architecture

Figure 1:
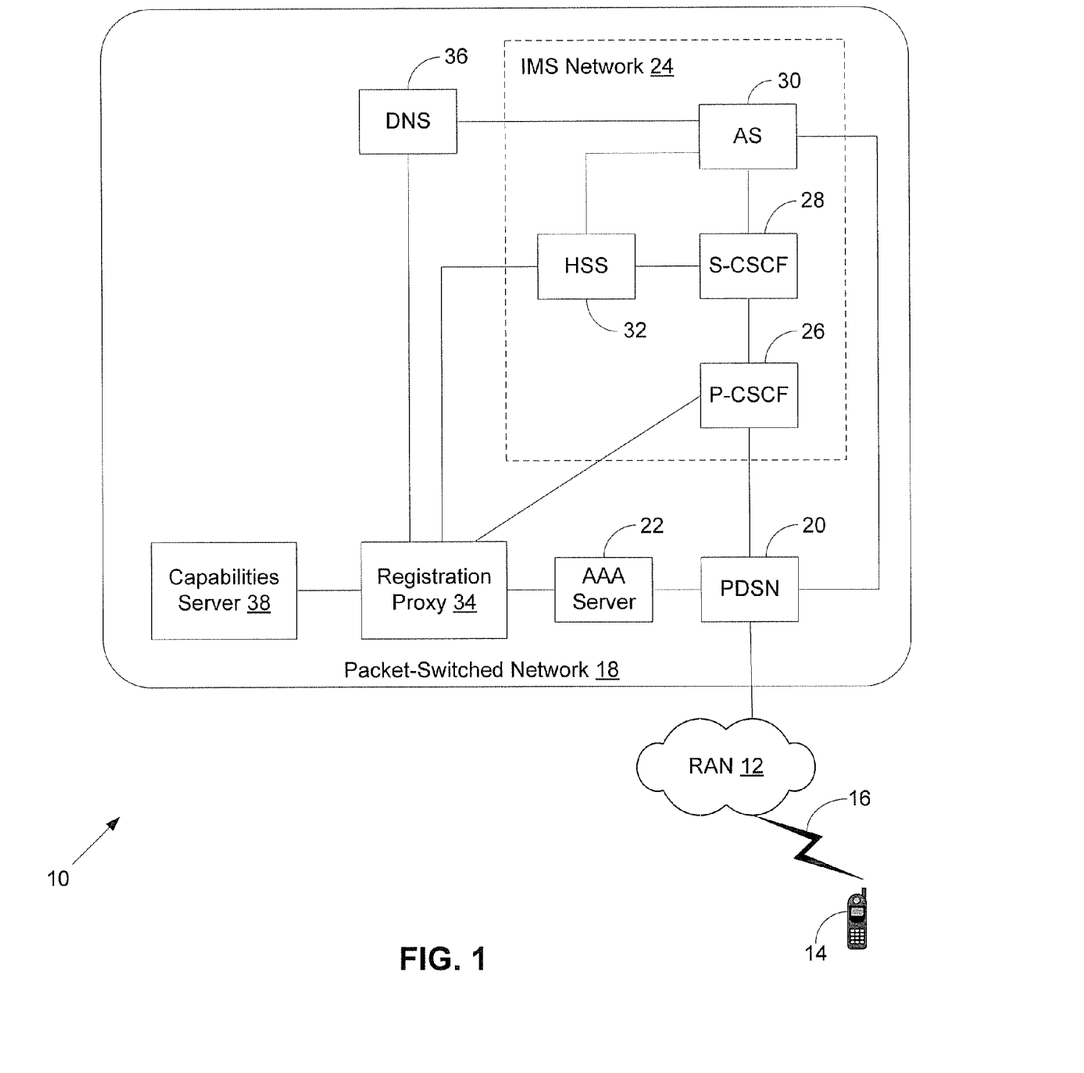
FIG. 1 is a block diagram of a telecommunications network, in accordance with an exemplary embodiment.

FIG. 1 illustrates an exemplary telecommunications network 10. Telecommunications network 10 includes a radio access network (RAN) 12 that can communicate with one or more mobile nodes, such as mobile node 14, via an air interface 16. Mobile node 14 could be, for example, a wireless telephone, a wireless personal digital assistant (PDA), a wirelessly equipped notebook computer, or other wireless communication device. The communications over air interface 16 may correspond to cdma2000, EVDO, GSM, WiFi (IEEE 802.11), WiMAX (IEEE 802.16) or some other wireless format. Thus, RAN 12 may include one or more base transceiver stations (BTSs), base station controllers (BSCs), radio network controllers, (RNCs), wireless access points, and/or other network elements to provide wireless coverage in a given area.

Mobile node 14 may communicate over air interface 16 in order to send and/or receive voice, data, or other media. Examples of services in which mobile node 14 may use air interface 16 include without limitation originating and receiving voice calls, sending and receiving text or multimedia messages, sending and receiving e-mail messages, Web browsing, location-based services, receiving streaming video or other media, and gaming services.

To provide such services, RAN 12 may be communicatively coupled to a packet-switched network 18. RAN 12 may also be communicatively coupled to a legacy wireless network, which may include a mobile switching center (MSC), home location register (HLR), and visitor location register (VLR).

Packet-switched network 18 is a network that conveys voice, data, and/or other media in the form of packets. It may include one or more private networks and/or public networks, which may be local area networks (LANs), metropolitan area networks (MANs) or wide area networks (WANs). For example, packet-switched network 18 may include the Internet. Packets may be routed in packet-switched network 18 based on network addresses, e.g., using the Internet Protocol (IP) in combination with the User Datagram Protocol (UDP) or Transmission Control Protocol (TCP).

Packet-switched network 18 may include a packet data serving node (PDSN) 20 that is communicatively coupled to RAN 12. PDSN 20 may function as a network access server providing mobile nodes, such as mobile node 14, with access to packet-switched network 18. Before providing network access to a mobile node, such as mobile node 14, PDSN 20 may first authenticate the mobile node and confirm that such network access is authorized, for example, by communicating with an authentication, authorization, and accounting (AAA) server 22. Such communication for authentication/authorization purposes may, for example, make use of RADIUS protocols. The basic RADIUS protocol is described in C. Rigney et al., "Remote Authentication Dial In User Service (RADIUS)," Request for Comments 2865, June 2000, which is incorporated herein by reference.

Once a mobile node is granted access to packet-switched network 18, PDSN 20 may transmit status messages to AAA server 22 regarding services provided to the mobile node. These status messages may, for example, make use of the RADIUS Accounting protocol. The basic RADIUS Accounting protocol is described in C. Rigney, "RADIUS Accounting," Request for Comments 2866, June 2000, which is incorporated herein by reference. In accordance with the RADIUS Accounting protocol, PDSN 20 transmits a START packet at the beginning of service delivery and transmits a STOP packet at the end of service delivery.

Packet-switched network 18 may also include an IMS network 24 that is able to provide communication services to mobile nodes using SIP. IMS network 24 may include a proxy call session call function (P-CSCF) 26 that sends and receives SIP messages to mobile nodes, such as mobile node 14, via PDSN 20 and RAN 12. More particularly, P-CSCF 26 may serve as a proxy for a serving call session control function (S-CSCF) 28. Thus, P-CSCF 26 may forward SIP messages received from S-CSCF 28 to PDSN 20 (for delivery to mobile nodes via RAN 12), and P-CSCF 26 may forward SIP messages received from mobiles nodes via RAN 12 and PDSN 20 to S-CSCF 28.

The service logic for providing services to mobile nodes may reside in one or more application servers, exemplified in FIG. 1 by application server (AS) 30. AS 30 may function as a short message service gateway (SMS-GW), using SIP to send SMS messages to mobile nodes. It is to be understood, however, that AS 30 could provide other types of communication services to mobile nodes. To provide communication services to mobile nodes in accordance with the IMS approach, AS 30 may receive SIP messages from S-CSCF 28 and may send SIP messages to S-CSCF 28, with P-CSCF 26 serving as proxy for S-CSCF 26. In some cases, AS 30 may also be able to provide services to mobile nodes without going through S-CSCF 28 and P-CSCF 26. For example, AS 30 may send SIP messages directly to a network element that corresponds to the mobile node's IP address (e.g., PDSN 20).

IMS network 24 may also include a home subscriber server (HSS) 32 that maintains IMS registrations of mobile nodes. HSS 32 may be communicatively coupled to S-CSCF 28 and AS 30. To effect an IMS registration of a mobile node, S-CSCF 28 may communicate with HSS 32 to register an association between one or more identifiers of the mobile node and an identifier of S-CSCF 28. Thereafter, to locate an IMS-registered mobile node, AS 30 may query HSS 32 to determine which S-CSCF is currently serving the mobile node. In this regard, although IMS network 24 is shown in FIG. 1 with only one S-CSCF and only one P-CSCF, IMS network 24 may include multiple S-CSCFs and multiple P-CSCFs. It is also to be understood that IMS network 24 may also include other types of network elements that are not shown in FIG. 1. For example, IMS network may also include an interrogating call session control function (I-CSCF).

Packet-switched network 18 may also include a registration proxy 34 that is configured to effect IMS registrations on behalf of mobile nodes. To effect an IMS registration on behalf of a mobile node, registration proxy 34 may communicate with either P-CSCF 26 or with HSS 32, as described in more detail below. Alternatively or additionally, registration proxy 34 may effect registrations on behalf of mobile nodes in other types of registries. For example, registration proxy 34 may be configured to register an association between a mobile node's IP address and hostname in a domain name server (DNS) 36 that is used by AS 30. In particular, AS 30 may query DNS 36 to determine a mobile node's IP address and, thereafter, provide communication services to that mobile node by sending one or more SIP messages to the mobile node's IP address.

To effect registrations automatically, registration proxy 34 may be communicatively coupled to AAA server 22, which may push information to registration proxy 34 in response to receiving RADIUS and/or RADIUS Accounting messages from PDSN 20. For example, PDSN 20 may send a RADIUS Accounting START message to AAA server 22 when PDSN 20 begins providing packet-data service for a mobile node (e.g., mobile node 14). In response, AAA server 22 may push information from the RADIUS Accounting START message to registration proxy 34. Registration proxy 34 may then use the information to register the mobile node with IMS network 24 and/or DNS 36.

Registration proxy 34 may also be communicatively coupled to a capabilities server 38 that stores information regarding the registration capabilities of mobile nodes, such as mobile node 14. In particular, capabilities server 38 may store information regarding which mobile nodes are SIP-capable and which SIP-capable mobile nodes are capable of effecting IMS registrations. As described in more detail below, registration proxy 34 may query capabilities server 38 to determine whether a mobile node lacks registration capability such that registration proxy 34 should effect a registration on behalf of the mobile node.

3. Exemplary Methods

Figure 2:
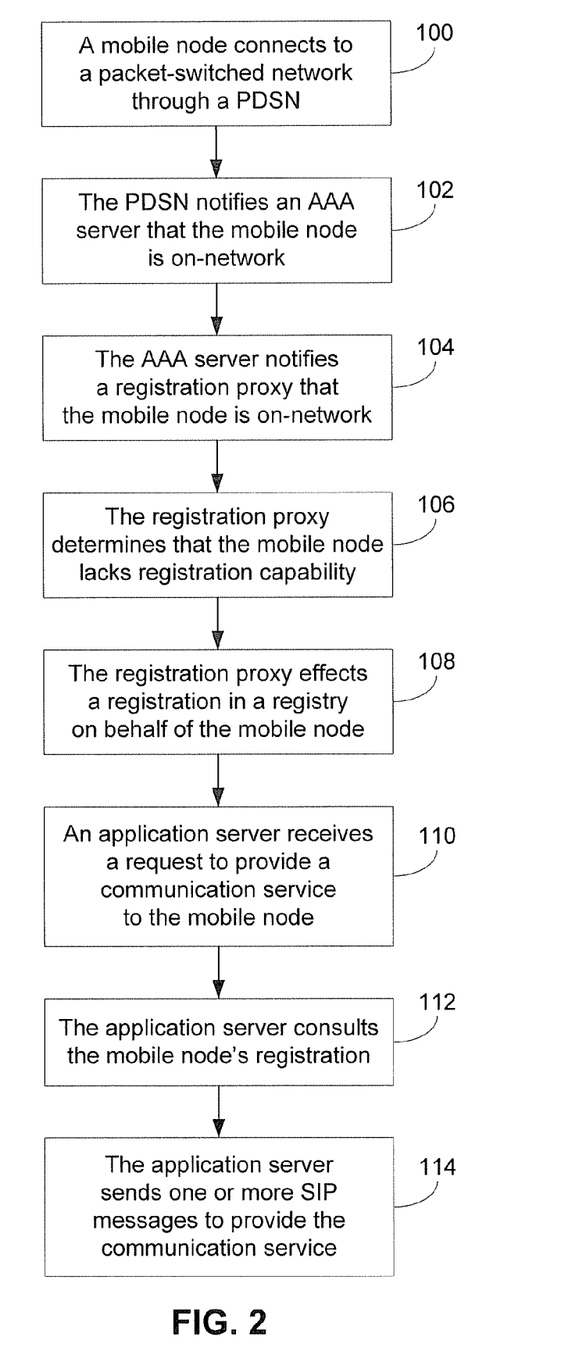
FIG. 2 is flow chart illustrating a method for registering a mobile node and using the mobile node's registration, in accordance with an exemplary embodiment.
Figure 3:
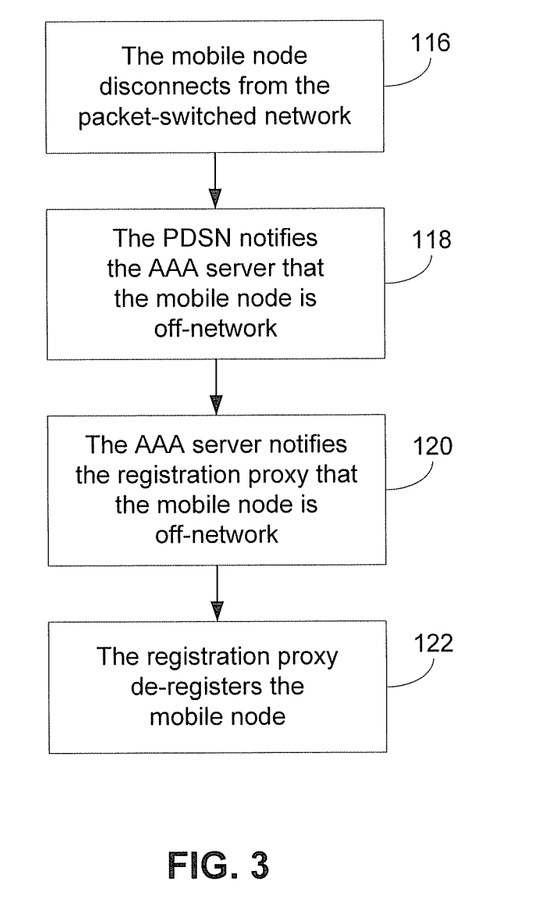
FIG. 3 is flow chart illustrating a method of de-registering a mobile node, in accordance with an exemplary embodiment.

FIGS. 2 and 3 are flowcharts illustrating an exemplary method for registering a mobile node using a registration proxy, using the mobile node's registration, and de-registering the mobile node. The method is explained with reference to the network architecture illustrated in FIG. 1. However, it is to be understood that other network architectures could be used.

With reference to FIG. 2, the method may begin when the mobile node (e.g., mobile node 14) connects to a packet-switched network through a PDSN (e.g., PDSN 20), as indicated by block 100. The process of connecting to the packet-switched network may involve various steps, such as authentication of the mobile node (e.g., by AAA server 22) and dynamically assigning an IP address to the mobile node (e.g., using either a Simple IP process or a Mobile IP process).

When the process of connecting the mobile node to the packet-switched network is completed, the PDSN may notify an AAA server (e.g., AAA server 22) that the mobile node is on-network, as indicated by block 102. The notification from the PDSN could be, for example, a Radius-Accounting START message. The notification from the PDSN may include various identifiers associated with the mobile node, such as the mobile node's MDN, NAI, and IP address.

The AAA server may, in turn, notify a registration proxy (e.g., registration proxy 34) that the mobile node is on-network, as indicated by block 104. The notification from the AAA server could be, for example, a SIP NOTIFY message. The notification from the AAA server may include the MDN, NAI, IP address and/or other identifiers that were included in the notification from the PDSN.

In response to receiving the notification from the AAA server, the registration proxy may determine that the mobile node lacks registration capability, as indicated by block 106. The registration proxy might make this determination by querying a capabilities server. The response from the capabilities server may indicate a registration capability for the mobile node (e.g., that the mobile node is SIP-capable but not does not support IMS registration). The registration proxy may determine from this indication that the mobile node's registration capability satisfies preset conditions for having the registration proxy effect a registration on behalf of the mobile node.

Thus, the registration proxy may then effect a registration in a registry on behalf of the mobile node, as indicated by block 108. The registry could be an HSS (e.g., HSS 32). To effect an IMS registration in HSS 32, the registration proxy could communicate with P-CSCF 26 (e.g., playing the role of UE in the IMS registration process) or with HSS 32 (e.g., playing the role of an S-CSCF in the IMS registration process). Alternatively, the registration proxy may effect a registration in a DNS (e.g., DNS 36), or in some other registry.

At some point after mobile node 14 has been registered, an application server (e.g., AS 30) may receive a request to provide a communication service to the mobile node, as indicated by block 110. The requested communication service could be, for example, a messaging service (SMS, IM, or MMS), VoIP service, location-based service, e-mail service, gaming service, or any other type of communication service. The request may originate from another mobile node, from a network element within the packet-switched network, or from outside of the packet-switched network (e.g., via a legacy wireless network). The request may include one or more identifiers associated with the mobile node (e.g., SIP URI or MDN) to identify the mobile node as the intended recipient.

In response to the request, the application server may consult the mobile node's registration, as indicated by block 112. For example, the application server may query HSS 32 or DNS 36 to determine how to reach the mobile node to provide the requested communication service. Alternatively, the application server may have already received the mobile node's registration in connection with the registration process.

The application server may then send one or more SIP messages to provide the requested communication service, as indicated by block 114. The application server may send different kinds of SIP messages to different destinations, depending on the information contained in the mobile node's registration. For example, when the registration proxy effects the registration in an HSS by emulating a UE, the application server may obtain the name of the S-CSCF serving the mobile node from the mobile node's registration. In that case, the application server would send the one or more SIP messages to the S-CSCF for delivery to the mobile node. However, when the registration proxy effects the registration in the HSS by emulating a S-CSCF (or when the registration is in a DNS), the application server may instead obtain the mobile node's IP address from the mobile node's registration. In such cases, the application sever may send the one or more SIP messages to the mobile node's IP address.

FIG. 3 is a flow chart continuing the exemplary method illustrated in FIG. 2. At some point, the mobile node disconnects from the packet-switched network, as indicated by block 116. The mobile node could be become disconnected from the packet-switched network because the mobile node logs off, times out, moves out of range, powers down, or for some other reason.

The PDSN may then notify the AAA server that the mobile node is off-network, as indicated by block 118. The notification from the PDSN could be, for example, a Radius-Accounting STOP message. The AAA server may, in turn, notify the registration proxy that the mobile node is off-network, as indicated by block 120. The notification from the AAA server could be, for example, a SIP NOTIFY message.

In response to the notification from the AAA server, the registration proxy may de-register the mobile node, as indicated by block 122. To de-register the mobile node, the register proxy may communicate with the same network element as used to effect the registration on behalf of the mobile node. Thus, the registration proxy might communicate with the P-CSCF or HSS in the case of an IMS registration and might communicate with the DNS in the case of a DNS registration.

Figure 4:
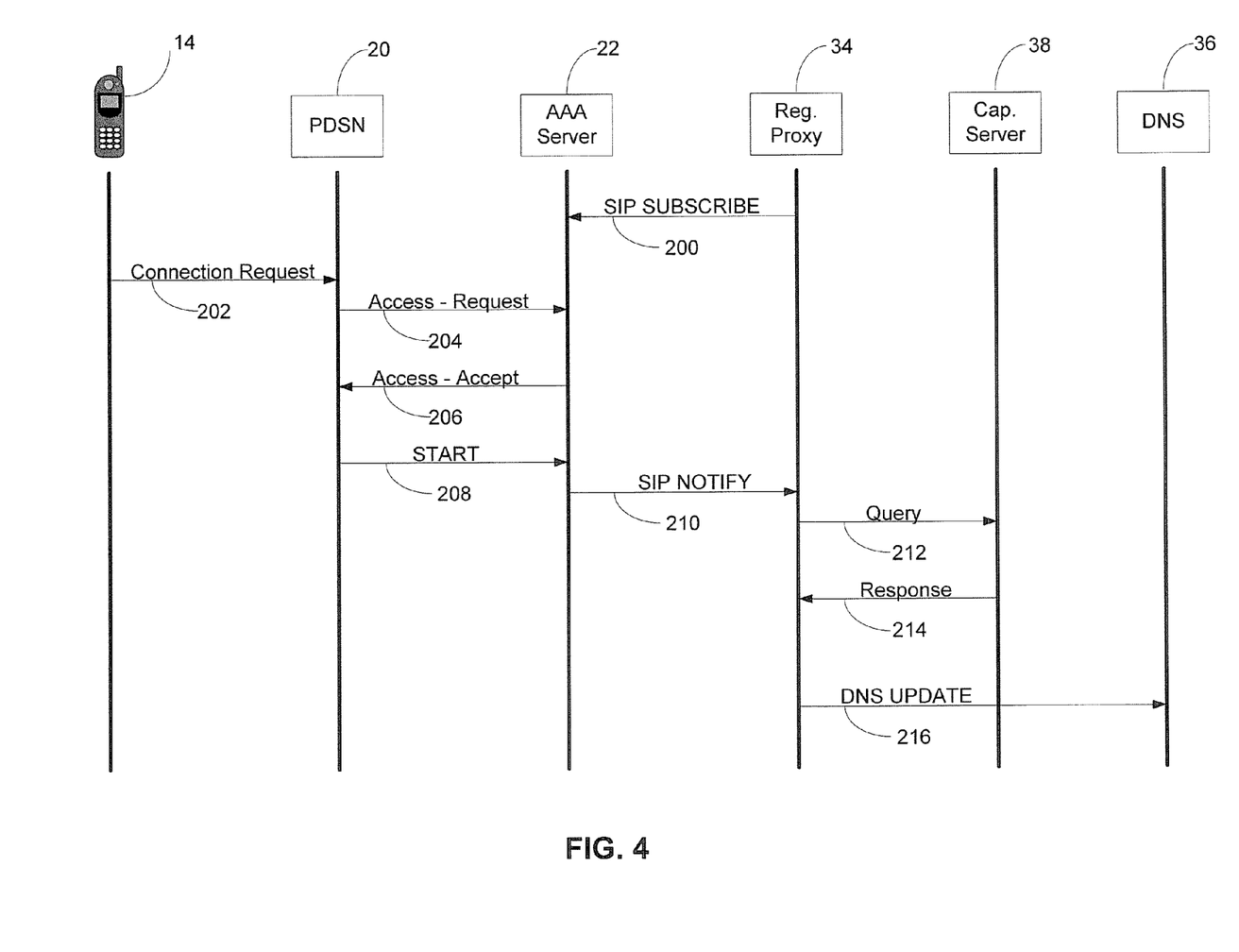
FIG. 4 is a call flow diagram illustrating a method of effecting a DNS registration on behalf of a mobile node, in accordance with an exemplary embodiment.

FIG. 4 is a call flow diagram illustrating an exemplary method for effecting a registration in DNS 36 on behalf of mobile node 14. The process may begin with registration proxy 34 sending a SIP SUBSCRIBE request to AAA server 22, as indicated by step 200. The SIP SUBSCRIBE request may ask AAA server 22 to notify registration proxy 34 when mobile nodes (or certain mobile nodes) become connected to packet-switched network 18 and to provide certain information in the notification regarding such newly-connected mobile nodes. In an exemplary embodiment, the information to be provided in the notification for a mobile node includes the mobile node's MDN and NAI, and the IP address assigned to the mobile node. It is to be understood, however, that other information could be included in the notification.

Subsequently, mobile node 14 requests connection to packet-switched network 18, as indicated by step 202. To authenticate the request, PDSN 20 transmits a RADIUS Access-Request message to AAA server 22, as indicated by step 204. If the request is acceptable, AAA server 22 may respond with an Access-Accept message, as indicated by step 206. In a Simple IP implementation, PDSN 20 may then assign an IP address to mobile node 14. In a Mobile IP implementation, PDSN 20 may instead register mobile node 14 with a home agent (not shown), so that the home agent assigns an IP address to mobile node 14.

At that point, PDSN 20 is able to begin providing packet-data service to mobile node 14. To indicate the beginning of packet-data service, PDSN 20 may send a RADIUS Accounting START message to AAA server 22, as indicated by step 208. Based on the SIP SUBSCRIBE request of step 200, AAA server 22 responsively sends a SIP NOTIFY request to registration proxy 34, as indicated by step 210. The SIP NOTIFY request includes the MDN, NAI, and IP address of mobile node 14.

Registration proxy 34 may then send a query to capabilities server 38 to determine the registration capability of mobile node 14, as indicated by step 212. Capabilities server 38 may send a response, as indicated by step 214. The response may indicate a registration capability of mobile node 14, from which registration proxy 34 can determine whether to effect a registration on behalf of mobile node 14. Alternatively, the response might include a registration instruction to registration proxy 34. Thus, in this example, the response might instruct registration proxy 34 to effect a DNS registration on behalf of mobile node 14.

Registration proxy 34 then sends a DNS UPDATE message to DNS 34 to register an association between the IP address and hostname of mobile node 14, as indicated by step 216. More particularly, the DNS UPDATE message may be used to create an "A" record for an IPv4 address and/or an "AAAA" record for an IPv6 address. The DNS UPDATE message may also be used to create other records for mobile node 14 in DNS 36. For example, the DNS UPDATE message may be used to create one or more "SRV" records for mobile node 14. For example, an SRV record may be used to identify a port number that mobile node 14 uses to receive SMS-over-SIP messages.

Registration proxy 34 may construct the hostname for mobile node 14 by concatenating the MDN of mobile node 14 (e.g., in an E.164 format) with a domain name of the service provider for mobile node 14. To construct the hostname in this way, registration proxy 34 may query one or more external databases.

The DNS UPDATE message from registration proxy 34 may also specify a time-to-live (TTL) value for the registration. The TTL value could, for example, correspond to the lifetime of the mobile node's IP session. That way, when the mobile node's IP session expires, the mobile node's DNS registration will also expire. The TTL value may be statically defined in registration proxy 34, or registration proxy may query an external database to obtain the TTL value. Alternatively, registration proxy may provide a very large TTL value (e.g., several weeks or months) in the DNS UPDATE message. Then, when the mobile node's DNS registration is to be cleared, registration proxy 34 may send another DNS UPDATE message that provides a TTL value of 0 for the mobile node's A/AAAA and/or SRV records.

Figure 5:
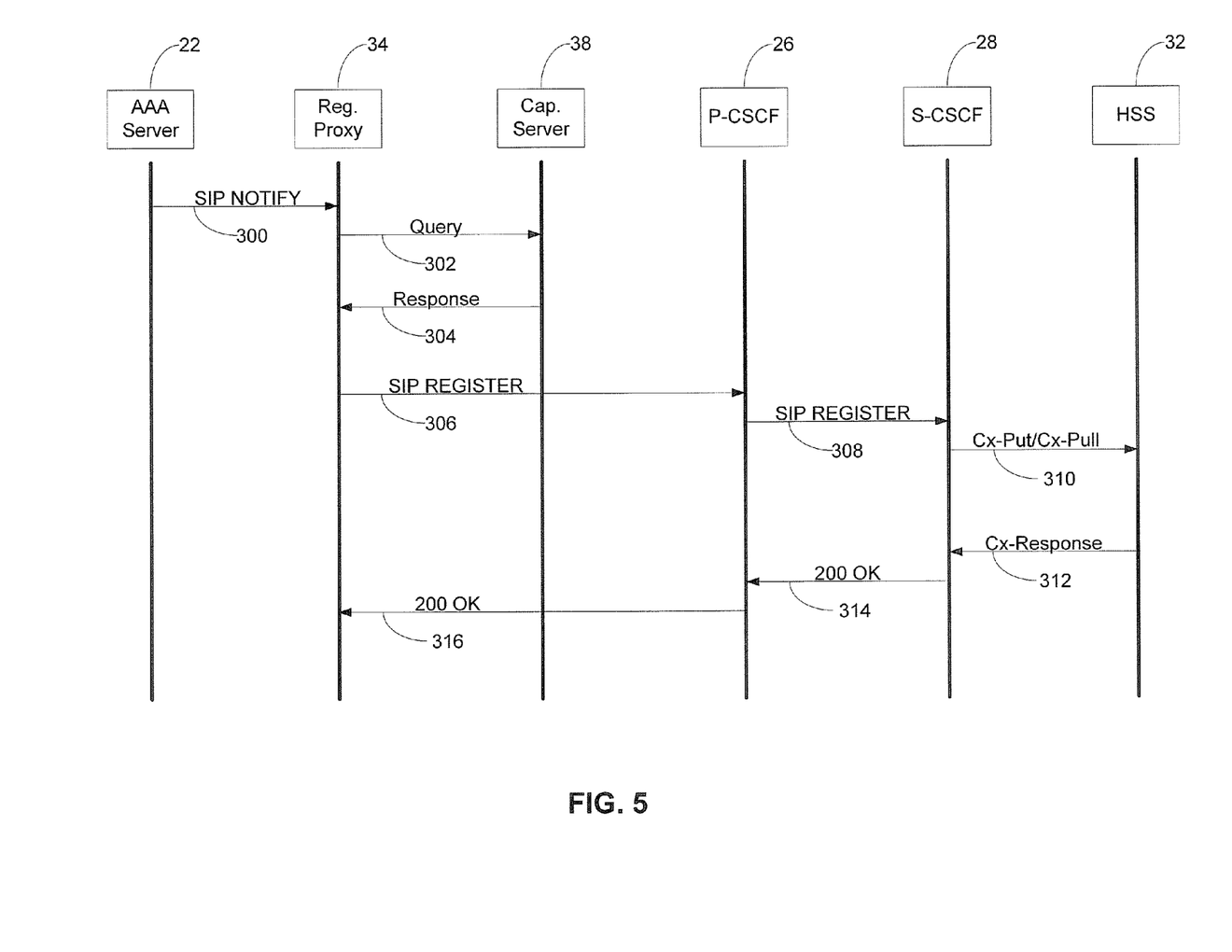
FIG. 5 is a call flow diagram illustrating a method of effecting an IMS registration on behalf of a mobile node, in accordance with an exemplary embodiment.
Figure 6:
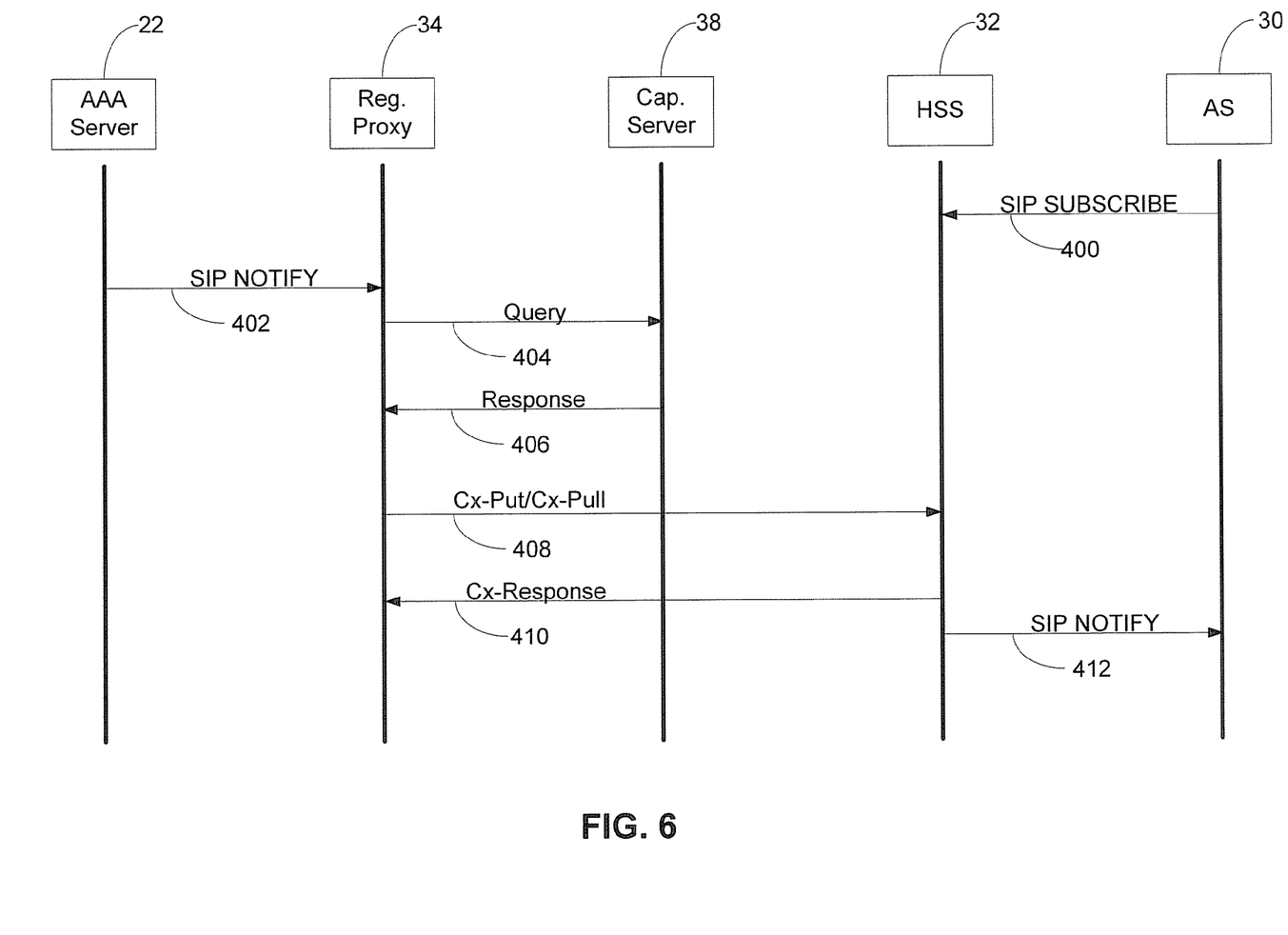
FIG. 6 is a call flow diagram illustrating a method of effecting an IMS registration on behalf of a mobile node, in accordance with an exemplary embodiment.

FIGS. 5 and 6 are call flow diagrams illustrating exemplary methods for effecting an IMS registration on behalf of mobile node 14. In FIG. 5, registration proxy 34 emulates a UE. In FIG. 6, registration proxy 34 emulates an S-CSCF. The call flows in FIGS. 5 and 6 begin with AAA server 22 sending a SIP NOTIFY message to registration proxy 34. Although the preceding steps are not shown in FIGS. 5 and 6, it is to be understood that the notification from AAA server 22 may be preceded by steps similar to steps 200-208 shown in FIG. 4.

With reference to FIG. 5, the process may begin when AAA server 22 sends a SIP NOTIFY message to registration proxy 34 indicating that mobile node 14 is on-network, as indicated by step 300. In response, registration proxy 34 may query capabilities server 38 regarding the registration capability of mobile node 14, as indicated by step 302. Capabilities server 38 may return a response, as indicated by step 304. In this example, the response indicates that the registration capability of mobile node 14 satisfies preset conditions (e.g., that mobile node 14 is SIP-capable but unable to perform an IMS registration) such that registration proxy 34 should effect an IMS registration on behalf of mobile node 14.

Registration proxy 34 may emulate a UE by sending a SIP REGISTER request to P-CSCF 26, as indicated by step 306. The SIP REGISTER request may include the IP address assigned to mobile node 14, a private identity used by mobile node 14 (e.g., the user's NAI), and a public identity used by mobile node 14 (e.g., the mobile node's MDN in the form of a SIP URI). Registration proxy 34 may obtain the information contained in the SIP REGISTER request regarding mobile node 14 from the SIP NOTIFY message received from AAA server 22 in step 300.

In response, P-CSCF 26 may store a correlation between the mobile node's IP address and the private and public identities. As a result of this correlation, P-CSCF 26 will be able to forward SIP messages that identify mobile node 14 by its public identity (e.g., by its MDN in the form of a SIP URI) to the mobile node's IP address. P-CSCF 26 may also send a SIP REGISTER request to S-CSCF 28, as indicated by step 308. This SIP REGISTER request may include the private and public identities, as well as an identifier of P-CSCF 26.

In response, S-CSCF 28 may store a correlation between the private and public identities and the identifier of P-CSCF 26. As a result of this correlation, S-CSCF 28 will be able to forward SIP messages that identify mobile node 14 by its public identity (e.g., by its MDN in the form of a SIP URI) to P-CSCF 26 for delivery to mobile node 14.

S-CSCF 28 may also send registration information to HSS 32, e.g., using the Cx-Put/Cx-Pull procedure, as indicated by step 310. This registration information may include the private identity used by mobile node 14 (e.g., NAI), the public identity used by mobile node 14 (e.g., MDN in the form of a SIP URI), and an identifier of S-CSCF 28.

In response, HSS 32 may retrieve a service profile that corresponds to the combination of private and public identities provided by S-CSCF 28. In addition, HSS 32 may store a correlation between the private identity used by mobile node 14 (e.g., NAI), the public identity used by mobile node 14

(e.g., MDN in the form of a SIP URI), and an identifier of S-CSCF 28. As a result of this correlation, HSS 32 will be able to identify S-CSCF 28 as currently serving mobile node 14.

HSS 32 may thereafter send a Cx-Response message to S-CSCF 28, as indicated by step 312. The Cx-Response message may indicate that the IMS registration was successful and may also include information from the service profile that is associated with the registered private and public identities of mobile node 14. In response, S-CSCF 28 may send P-CSCF 26 a SIP 200 OK message to indicate successful registration, as indicated by step 314. P-CSCF 26 may then send a SIP 200 OK message to registration proxy 34 to indicate successful registration, as indicated by step 316.

It is to be understood that the call flow in FIG. 5 is illustrated in a simplified form. For example, instead of sending a SIP REGISTER request to S-CSCF 28 directly, P-CSCF 26 may send a SIP REGISTER requesting to an interrogating call session control function (I-CSCF). In response, the I-CSCF may query HSS 32 to obtain an identification of S-CSCF 28. The I-CSCF may then forward the SIP REGISTER request to S-CSCF 28.

As a result of the registration process illustrated in FIG. 5, network elements in IMS network 24 may query HSS 32 to determine that S-CSCF 28 is currently serving mobile node 14. For example, in response to receiving a request to provide a communication service to mobile node 14, AS 30 may query HSS 32 to obtain an identification of S-CSCF 28. To provide the requested communication service, AS 20 may send a SIP message to S-CSCF 28 for delivery to mobile node 14. S-CSCF 28 may then send the SIP message to P-CSCF 26 (based on the correlation between P-CSCF 26 and public identity of mobile node 14 that S-CSCF 28 stored during registration), and P-CSCF 26 may send the SIP message to the IP address of mobile node 14 (based on the correlation between IP address and public identity of mobile node 14 that P-CSCF 26 stored during registration.

FIG. 6 illustrates an alternative approach in which registration proxy 34 communicates with HSS 32 directly, i.e., emulating an S-CSCF in the IMS registration process. Moreover, in this example, AS 30 subscribes to changes in the status of IMS registrations. To do this, AS 30 may send a SIP SUBSCRIBE message to HSS 32, as indicated by step 400.

At some later time, registration proxy 34 receives a notification (e.g., a SIP NOTIFY message) from AAA server 22 that mobile node 14 is on-network, as indicated by step 402. The notification may include the IP address, NAI, and MDN used by mobile node 14. In response, registration proxy 34 may send a query to capabilities server 38 to determine whether to effect a registration on behalf of mobile node 14, as indicated by step 404. In this case, the response from capabilities server 38 (step 406) indicates that registration proxy 34 should effect a registration on behalf of mobile node 14.

Emulating an S-CSCF, registration proxy 34 then sends registration information to HSS 32, e.g., using the Cx-Put/Cx-Pull procedure, as indicated by step 408. This registration information may include information regarding mobile node 14 that was provided by the SIP NOTIFY message from AAA server 22 in step 402. Thus, the registration information may include the NAI as the private identity used by mobile node 14, the MDN (in the form of a SIP URI) as the public identity used by mobile node 14, and the IP address of mobile node 14.

In response, HSS 32 may store a correlation between the private identity used by mobile node 14 (the NAI), the public identity used by mobile node 14 (the MDN in the form of a SIP URI), and the IP address of mobile node 14. In addition, HSS 32 may send registration proxy 34 a Cx-Response message to indicate successful registration, as indicated by step 410.

Further, since AS 30 has subscribed to registration status changes, HSS 32 sends a SIP NOTIFY message to AS 30, as indicated by step 412. The SIP NOTIFY message may include the public identity used by mobile node 14 (MDN in the form of a SIP URI) and IP address of mobile node 14, and AS 30 may store a correlation between this information. That way, when AS 30 receives a request to provide a communication service to mobile node 14, AS 30 may determine the IP address of mobile node 14 that corresponds to the public identity contained in the request without having to query HSS 32. Then, to provide the requested communication service, AS 30 may send SIP messages directly to the IP address of mobile node 14, i.e., without involving S-CSCF 28 and P-CSCF 26.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for registering a mobile node with a registry that is communicatively coupled to an application server, said application server providing communication services via a packet-switched network to mobile nodes based on their respective registrations in said registry, said method comprising:
   a first network element determining from a status message generated by a packet data serving node (PDSN) that said mobile node is connected to said packet-switched network;
   said first network element responsively sending a notification message to a second network element, said notification message including a network address of said mobile node and at least one other identifier associated with said mobile node; and
   after receiving said notification message, said second network element communicating via said packet-switched network to effect a registration in said registry on behalf of said mobile node, wherein said registration correlates said network address with said at least one other identifier.

2. The method of claim 1, wherein said at least one other identifier includes a mobile directory number (MDN) of said mobile node.

3. The method of claim 1, wherein said registry is a home subscriber server (HSS).

4. The method of claim 3, wherein said registration in said HSS correlates said network address with a mobile directory number (MDN) of said mobile node.

5. The method of claim 1, wherein said first network element is an authentication, authorization, and accounting (AAA) server.

6. The method of claim 5, wherein said status message is a RADIUS Accounting START message.

7. The method of claim 1, wherein said second network element is a registration proxy.

8. The method of claim 1, wherein said network address is an Internet Protocol (IP) address.

9. The method of claim 1, wherein said application server is a short message service gateway (SMS-GW).

10. The method of claim 1, wherein said network address is assigned by said PDSN.

11. The method of claim 1, wherein said network address is assigned by a home agent.

12. A method for registering a mobile node with a registry that is communicatively coupled to an application server, said application server providing communication services via a packet-switched network to mobile nodes based on their respective registrations in said registry, said method comprising:
- a registration proxy receiving a notification that said mobile node is connected to said packet-switched network;
- in response to said notification, said registration proxy determining a registration capability of said mobile node, wherein said registration proxy determining a registration capability of said mobile node comprises said registration proxy querying a capabilities server and receiving a response that indicates said registration capability of said mobile node; and
- in response to a determination that said registration capability of said mobile node is insufficient, said registration proxy effecting a registration in said registry on behalf of said mobile node.

13. The method of claim 12, wherein said registry is a home subscriber server (HSS), and wherein said registration in said HSS correlates an Internet Protocol (IP) address of said mobile node with a mobile directory number (MDN) of said mobile node.

14. The method of claim 13, wherein said registration proxy effecting a registration in said registry on behalf of said mobile node comprises:
- said registration proxy emulating a serving call state control function (S-CSCF) to register said IP address and MDN, as Session Initiation Protocol Uniform Resource Identifiers (SIP URIs), with said HSS.

15. The method of claim 13, wherein said registration proxy effecting a registration in said registry on behalf of said mobile node comprises:
- said registration proxy emulating user equipment (UE) to register said MDN, as a Session Initiation Protocol Uniform Resource Identifier (SIP URI), with said HSS via at least one call state control function (CSCF).

16. A system, comprising:
- a registry for storing registrations of mobile nodes;
- an application server communicatively coupled to said registry, wherein said application server is configured to provide communication services via a packet-switched network to mobile nodes based on registrations stored in said registry;
- a registration proxy configured to effect registrations in said registry on behalf of mobile nodes that lack registration capability; and
- an authentication, authorization, and accounting (AAA) server configured to notify said registration proxy when mobile nodes connect to said packet-switched network.

17. The system of claim 16, further comprising:
- a capabilities server that stores registration capabilities of mobile nodes, wherein said registration proxy is configured to query said capabilities server to determine which mobile nodes lack registration capability.

18. The system of claim 16, wherein said registry is a home subscriber server (HSS).

19. The system of claim 16, wherein said registry is a domain name server (DNS).

* * * * *